(12) United States Patent
Åström et al.

(10) Patent No.: US 12,089,173 B2
(45) Date of Patent: Sep. 10, 2024

(54) CONFIGURATION OF RSS DEPLOYMENT IN A WIRELESS COMMUNICATION NETWORK

(71) Applicant: Telefonaktiebolaget LM Ericsson (publ), Stockholm (SE)

(72) Inventors: Magnus Åström, Lund (SE); Anders Wallén, Ystad (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 414 days.

(21) Appl. No.: 17/607,282

(22) PCT Filed: Apr. 30, 2020

(86) PCT No.: PCT/EP2020/062134
§ 371 (c)(1),
(2) Date: Oct. 28, 2021

(87) PCT Pub. No.: WO2020/225130
PCT Pub. Date: Nov. 12, 2020

(65) Prior Publication Data
US 2022/0217666 A1 Jul. 7, 2022

Related U.S. Application Data

(60) Provisional application No. 62/842,790, filed on May 3, 2019.

(51) Int. Cl.
*H04W 56/00* (2009.01)
*H04W 72/04* (2023.01)
(Continued)

(52) U.S. Cl.
CPC ... *H04W 56/0015* (2013.01); *H04W 72/0446* (2013.01); *H04W 72/0453* (2013.01)

(58) Field of Classification Search
None
See application file for complete search history.

(56) References Cited

U.S. PATENT DOCUMENTS

2019/0229973 A1* 7/2019 Sengupta ............. H04J 11/0079
2019/0306812 A1* 10/2019 Sengupta ............. H04L 5/0064
(Continued)

FOREIGN PATENT DOCUMENTS

WO 2019063569 A1 4/2019

OTHER PUBLICATIONS

International Search Report and Written Opinion dated Aug. 17, 2020 for International Application No. PCT/EP2020/062134 filed Apr. 30, 2020, consisting of 10-pages.
(Continued)

*Primary Examiner* — Duc T Duong
(74) *Attorney, Agent, or Firm* — Weisberg I.P. Law, P.A.

(57) ABSTRACT

A method and apparatus are disclosed for configuration of resynchronization signal (RSS) in a radio network. In one embodiment, a wireless device (WD) is configured to determine a deployment alternative for a resynchronization signal (RSS) in the radio network, the determining of the deployment alternative including determining whether a time-frequency resource used for an the RSS in a second cell in the radio network is a same time-frequency resource as a time-frequency resource used for the RSS in the first cell. The WD is also configured to determine information about the RSS time-frequency resource used in the second cell in the radio network based at least in part on the determined deployment alternative, and to detect the RSS in the second cell using the determined information about the RSS time-frequency resource used for the RSS in the second cell.

22 Claims, 11 Drawing Sheets

(51) Int. Cl.
*H04W 72/0446* (2023.01)
*H04W 72/0453* (2023.01)

(56) References Cited

U.S. PATENT DOCUMENTS

| 2021/0076339 | A1* | 3/2021 | Kalhan | H04B 17/318 |
| 2021/0084602 | A1* | 3/2021 | Kalhan | H04W 56/001 |
| 2021/0306888 | A1* | 9/2021 | Kim | H04W 24/08 |
| 2023/0026845 | A1* | 1/2023 | Wong | H04W 56/0015 |

OTHER PUBLICATIONS

3GPP TS 36.211 V15.5.0; 3rd Generation Partnership Project; Technical Specification Group Radio Access Network; Evolved Universal Terrestrial Radio Access (E-UTRA); Physical channels and modulation (Release 15), Mar. 2019, consisting of 10-pages.

3GPP TS 36.331 V15.5.1; 3rd Generation Partnership Project; Technical Specification Group Radio Access Network; Evolved Universal Terrestrial Radio Access (E-UTRA); Radio Resource Control (RRC); Protocol specification (Release 15), Apr. 2019, consisting of 24-pages.

3GPP TSG-RAN WG1 Meeting #96bis R1-1905768; Title: RAN1 agreements for Rel-16 Additional MTC Enhancements for LTE; Agenda Item: 6.2.1; Source: WI rapporteur (Ericsson); Document for: Information; Date and Location: Apr. 8-12, 2019, Xi'an, China, consisting of 27-pages.

3GPP TSG-RAN WG2 Meeting #105bis R2-1904512; Title: Signaling Configuration of RSS; Agenda Item: 12.1.10; Source: Ericsson; Document for: Discussion, Decision; Date and Location: Apr. 8-12, 2019, Xi'an, China, consisting of 4-pages.

3GPP TSG RAN meeting #83 RP-190770 (revision of RP-182891); Title: Revised WID: Additional MTC Enhancements for LTE; Agenda Item: 10.3.1; Source: Ericsson; Document for: Approval; Date and Location: Mar. 18-21, 2019, Shenzhen, China, consisting of 5-pages.

3GPP TS 36.211 V13.13.0; 3rd Generation Partnership Project; Technical Specification Group Radio Access Network; Evolved Universal Terrestrial Radio Access (E-UTRA); Physical channels and modulation (Release 13); Dec. 2019, consisting of 173-pages.

* cited by examiner

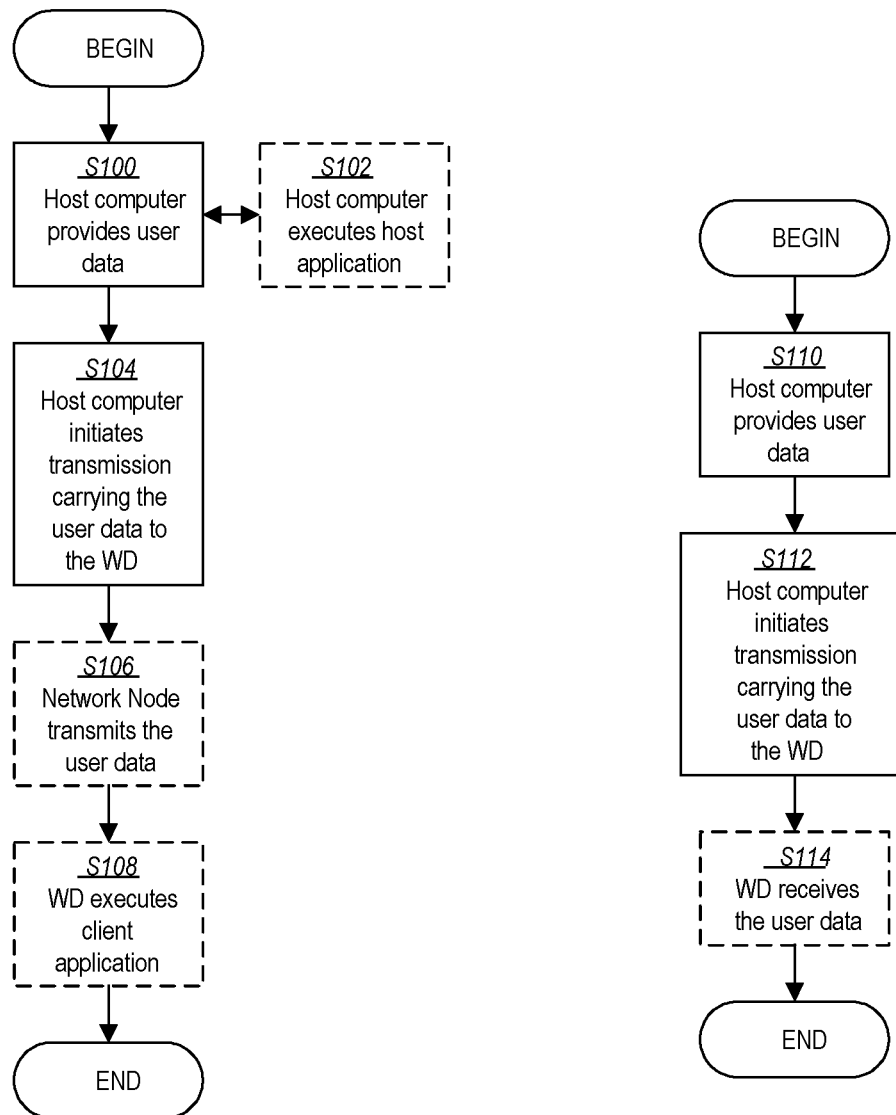

CONFIGURATION OF RSS DEPLOYMENT IN A WIRELESS COMMUNICATION NETWORK

CROSS-REFERENCE TO RELATED APPLICATIONS

This application is a Submission Under 35 U.S.C. § 371 for U.S. National Stage Patent Application of International Application No.: PCT/EP2020/062134, filed Apr. 30, 2020 entitled "CONFIGURATION OF RSS DEPLOYMENT IN A WIRELESS COMMUNICATION NETWORK," which claims priority to U.S. Provisional Application No. 62/842,790, filed May 3, 2019, entitled "CONFIGURATION OF RSS DEPLOYMENT IN A WIRELESS COMMUNICATION NETWORK," the entireties of both of which are incorporated herein by reference.

TECHNICAL FIELD

The present disclosure relates to wireless communications, and in particular, to configuration of resynchronization signal (RSS) deployment in a wireless communication network.

BACKGROUND

Coverage in eMTC and NB-IoT

Cell coverage in both enhanced Machine-type communication (eMTC, also referred to as Long Term Evolution (LTE)-MTC or LTE-M) and Narrowband-Internet-of-Things (NB-IoT) is controlled at least in part by the maximum number of repetitions of downlink (DL) channels (e.g., MTC Physical Downlink Control Channel (MPDCCH), MTC Physical Downlink Shared Channel (MPDSCH), etc.). For example, Rmax is a maximum number of repetitions used for transmitting a message. The Rmax values may be defined in values from 1 to 2048, where the next value is a doubling of the previous one. The coverage of a specific number of repetitions, R, is not only dependent on Rmax, but also on the message size, since a longer message typically requires a higher R compared to a shorter message, provided that both have the same coverage. Paging messages using the MPDCCH for eMTC, are typically the same size (although not necessarily being of the same number of message repetitions) for a given cell, providing a constant maximum coverage.

Measurements performed by the wireless device (WD) (e.g., user equipment (UE)) are typically performed on the serving cell as well as on neighbor cells over some known reference symbols or pilot sequences. The measurements are performed on cells on an intra-frequency carrier, inter-frequency carrier(s), as well as on inter-Radio Access Technology (RAT) carriers(s) (depending upon the WD capability such as whether the WD supports that RAT). To enable inter-frequency and inter-RAT measurements for the WD requiring gaps, the network node configures the measurement gaps.

The measurements are performed for various purposes. Some example measurement purposes are: mobility, positioning, self-organizing network (SON), minimization of drive tests (MDT), operation and maintenance (O&M), network planning and optimization, etc. Examples of measurements in Long Term Evolution (LTE) are cell identification, also known as Physical Cell Identifier (PCI) acquisition, Reference Symbol Received Power (RSRP), Reference Symbol Received Quality (RSRQ), cell global ID (CGI) acquisition, Reference Signal Time Difference (RSTD), WD RX-TX time difference measurement, Radio Link Monitoring (RLM), which includes Out of Synchronization (out of sync) detection and In Synchronization (in-sync) detection, etc. Channel State Information (CSI) measurements performed by the WD are used for scheduling, link adaptation, etc., by the network node. Examples of CSI measurements or CSI reports are Channel Quality Indicator (CQI), Precoding Matrix Indicator (PMI), Rank Indicator (RI), etc. They may be performed on reference signals like Cell-specific reference signals (CRS), CSI-reference signals (CSI-RS) or Demodulation Reference Signals (DMRS).

In order to identify an unknown cell (e.g., a new neighbor cell), the WD acquires the timing of that cell and eventually the physical cell ID (PCI). In legacy LTE operation (from 3GPP Release 8), the downlink (DL) subframe #0 and subframe #5 carry synchronization signals (i.e., both primary synchronization signal (PSS) and secondary synchronization signal (SSS)). This is referred to as cell search or cell identification. The PSS and SSS contains information about a PCI, also referred to as a cell identity or cell ID, represented by and integer from 0 to 503. Subsequently, the WD also measures the reference signal received power (RSRP) and/or reference signal received quality (RSRQ) of the newly identified cell in order to be used by the WD and/or report the measurement to the network node. The cell search is also a type of measurement. The measurements are performed in all Radio Resource Control (RRC) states, i.e., in RRC idle and connected states. In RRC connected state, the measurements are used by the WD for one or more tasks such as for reporting the results to the network node. In RRC idle state the measurements are used by the WD for one or more tasks such as for cell selection, cell reselection, etc.

Resynchronization Signal $3^{rd}$ Generation Partnership Project (3GPP) LTE-MTC Release 15 (Rel-15) introduces the resynchronization signal (RSS). The reason for introducing the RSS was to provide a synchronization signal that is transmitted in bursts consisting of several repetitions within a relatively short time frame, as opposed to the PSS and SSS mentioned above, which are transmitted regularly but using only one orthogonal frequency division multiplexed (OFDM) symbol each in every 5 ms interval. As the name hints, the resynchronization signal was primarily intended to be used when the WD is performing a resynchronization when returning from an idle state after first having obtained an initial synchronization using the PSS and SSS as described above. Similar to the repetition introduced for other channels discussed above, the repetitions of the RSS improves the coverage and helps the WD conserve power compared to using the PSS and SSS also for resynchronization.

The 3GPP Release 16 work item description of Additional MTC enhancements for LTE stated that:

"The objective is to specify the following set of improvements for machine-type communications for Bandwidth reduced Low complexity/Coverage Enhancement (BL/CE) UEs.
[ ... ]
Mobility Enhancement:
Consider improving the DL RSRP and, if needed, RSRQ measurement accuracy, through use of RSS [RAN1, RAN4, RAN2]." where RAN stands for Radio Access Network.

As explained above, the resynchronization signal is a signal that assists WDs in areas of poor coverage to achieve network synchronization. As shown in FIG. 1, which illustrates an example Time-Frequency Grid of RSS, network synchronization may be achieved by providing substantial synchronization energy over a short time interval. The RSS is allocated to the 11 contiguous symbols in a subframe, spanning only 2 physical resource blocks (PRBs) in the frequency domain, although LTE-MTC typically uses a 6 PRB bandwidth (BW). Here, a PRB according to the LTE standard consists of 12 subcarriers, occupying a bandwidth of 180 kHz. Furthermore, the LTE-MTC bandwidth of 6 consecutive PRBs in the frequency domain is referred to herein as a "narrowband", as defined in 3GPP Technical Specification (TS) 36.211 version 13.13.0. This does not preclude other definitions being used for these terms when applying the different embodiments herein. The reason for the smaller BW used by the RSS is to decrease WD detection complexity. Both the duration and the periodicity of the RSS are configurable. The RSS may take durations of 8 to 40 milliseconds (ms) and periods of 160 to 1280 ms.

Existing Abstract Syntax Notation 1 (ASN.1) structure for RSS configuration from 3GPP Technical Specification (TS) 36.331 is presented below:

```
-- ASN1START
RSS-Config-r15 ::=      SEQUENCE {
  duration-r15          ENUMERATED {sf8, sf16, sf32, sf40},
  freqLocation-r15      INTEGER (0..98),
  periodicity-r15       ENUMERATED {ms160, ms320, ms640, ms1280},
  powerBoost-r15        ENUMERATED {dB0, dB3, dB4dot8, dB6},
  timeOffset-r15        INTEGER (0..31)
}
-- ASN1STOP
```

RSS-Config field descriptions

Duration

Duration of RSS in subframes. Value sf8 corresponds to 8 subframes, value sf16 corresponds to 16 subframes and so on.

freqLocation

Frequency location (lowest PRB number) of RSS.

periodicity

Periodicity of RSS. Value ms160 corresponds to 160 ms, value ms320 corresponds to 320 ms and so on.

powerBoost

Power offset of RSS relative to CRS in dB. Value dB0 corresponds to 0 dB, value dB3 corresponds to 3 dB, value dB4dot8 corresponds to 4.8 dB and so on.

timeOffset

Time offset of RSS in frames. The actual value of time offset is based on the value of duration, as follows:
For duration 160 ms, only value range 0 to 15 are applicable.
Actual value = timeOffset * 1 frames.
For duration 320 ms, actual value = timeOffset * 1 frames.
For duration 640 ms, actual value = timeOffset * 2 frames.
For duration 1280 ms, actual value = timeOffset * 4 frames.

The physical layer implementation of the RSS is defined in 3GPP Technical Specification (TS) 36.211, subclause 6.11.3.

In addition to the above, the cell ID and the antenna port configuration are signaled, since measurements depend on the power relation (energy per resource element or EPRE) between the RSS and CRS. However, the existing configuration of the RSS is inefficient for the purpose of using it for measurements on neighboring cells.

SUMMARY

Some embodiments advantageously provide methods, wireless devices and network nodes for configuration of resynchronization signal (RSS) deployment in a wireless communication network.

In one embodiment, a network node is configured to determine a deployment alternative for a resynchronization signal (RSS); determine an RSS configuration, the RSS configuration based at least in part on the determined deployment alternative; and optionally, allocate the RSS according to the determined RSS configuration. In some embodiments, the determining of the deployment alternative includes determining whether an RSS time-frequency resource used for a first cell is being used for at least one additional cell in the radio network. In some embodiments, a set of deployment alternatives may include one or more of: collocation of the RSS in the same time-frequency resource for all cells in a network; a unique allocation of the RSS within a narrowband; a unique allocation of the RSS within a number of narrowbands; and a unique allocation of the RSS within a carrier. When the notion of a "unique allocation of the RSS" is used herein, it may be understood such that it is possible to uniquely determine the allocation of the RSS. This does not necessarily preclude the possibility that a given location may correspond to different cell identities.

In another embodiment, a wireless device (WD) is configured to determine a deployment alternative for a resynchronization signal (RSS). The WD is also configured to determine an RSS configuration, the RSS configuration based at least in part on the determined deployment alternative. In some embodiments, the determining of the deployment alternative includes determining whether an RSS time-frequency resource used for a first cell is being used for at least one additional cell in the radio network. The WD is also configured to detect the RSS in a cell using the RSS configuration.

According to one aspect, a method implemented in a wireless device, WD, configured to wirelessly connect to a first cell in a radio network is provided. The method includes determining a deployment alternative for a resynchronization signal, RSS, in the radio network. The determining of the deployment alternative includes determining whether a time-frequency resource used for an RSS in a second cell in the radio network is a same time-frequency resource as a time-frequency resource used for an RSS in the first cell. The method includes determining information about an RSS time-frequency resource used in a second cell in the radio network based at least in part on the determined deployment alternative. The method also includes detecting the RSS in the second cell using the determined information about the RSS time-frequency resource used in the second cell.

According to this aspect, in some embodiments, the method further includes performing one or more measurements using the detected RSS in the second cell. In some embodiments, determining the deployment alternative comprises receiving an indication of the deployment alternative via a System Information, SI, message. In some embodiments, the method further includes, when the determining of the deployment alternative indicates that the time-frequency resource used for the RSS in the first cell is different from the time-frequency resource used for the RSS in the second cell, receiving an indication of which one or more narrowbands are used for RSS in the radio network via a System Information, SI, message. In some embodiments, the determining of the deployment alternative indicates that the time-frequency resource used for the RSS in the first cell is different from the time-frequency resource used for the RSS in the second cell, then at least one of a time and a frequency of the time-frequency resource used for the RSS in the second cell is determined based at least in part on a function of a cell identity of the second cell. In some embodiments, the function is based at least in part on a periodicity of an RSS in the first cell.

According to another aspect, a WD wirelessly connected to a first cell in a radio network is provided. The WD incudes processing circuitry configured to determine a deployment alternative for a resynchronization signal, RSS, in the radio network, the determining of the deployment alternative including determining whether a time-frequency resource used for an RSS in a second cell in the radio network is a same time-frequency resource as a time-frequency resource used for the RSS in the first cell. The processing circuitry is further configured to determine information about the RSS time-frequency resource used in the second cell in the radio network based at least in part on the determined deployment alternative. The processing circuitry is further configured to detect the RSS in the second cell using the determined information about the RSS time-frequency resource used for the RSS in the second cell.

According to this aspect, in some embodiments, the processing circuitry is further configured to perform one or more measurements using the detected RSS in the second cell. In some embodiments, determining a deployment alternative comprises receiving an indication of the deployment alternative via a System Information, SI, message. In some embodiments, the processing circuitry is further configured to, when the determining of the deployment alternative indicates that the time-frequency resource used for the RSS in the first cell is different from the time-frequency resource used for the RSS in the second cell, receiving an indication of which one or more narrowbands are used for RSS in the radio network via a System Information, SI, message. In some embodiments, when the determining of the deployment alternative indicates that the time-frequency resource used for the RSS in the first cell is different from the time-frequency resource used for the RSS in the second cell, then at least one of a time and a frequency of the time-frequency resource used for the RSS in the second cell is determined based at least in part on a function of a cell identity of the second cell. In some embodiments, the function is based at least in part on a periodicity of an RSS in the first cell.

According to yet another aspect, a method in a network node configured to serve multiple cells in a radio network is provided. The method includes determining a deployment alternative for a resynchronization signal, RSS, in the radio network, the determining of the deployment alternative including determining whether a RSS time-frequency resource used for a first cell in the radio network is being used for at least one additional cell in the radio network. The method includes determining information about the RSS time-frequency resource in the at least one additional cell served by the network node based at least in part on the determined deployment alternative. The method includes allocating the RSS in the at least one additional cell according to the determined information about the RSS time-frequency resource in the at least one additional cell.

According to this aspect, in some embodiments, determining the deployment alternative further includes determining whether an RSS time-frequency resource used for a first cell is being used for all of a plurality of cells in the radio network. In some embodiments, the method further includes sending an indication of the deployment alternative via a System Information, SI, message in the at least one additional cell. In some embodiments, the method includes sending an indication about which one or more narrowbands are used for RSS in the radio network via a System information, SI, message in the at least one additional cell. In some embodiments, the time-frequency resource used for the RSS in at least one additional cell is determined based at least in part on a function of a cell identity of the at least one additional cell. In some embodiments, the function is based at least in part on a periodicity of an RSS in the first cell. In some embodiments, determining a deployment alternative includes receiving a message from another network node in the radio network or a core network node serving the radio network node.

According to another aspect, a network node configured to serve multiple cells in a radio network. The network node includes processing circuitry configured to determine a deployment alternative for a resynchronization signal, RSS, in the radio network. The determining of the deployment alternative includes determining whether an RSS time-frequency resource of the RSS used for a first cell in the radio network is being used for at least one additional cell in the radio network. The processing circuitry is further configured to determine information about the RSS time-frequency resource in the at least one additional cell served by the network node based at least in part on the determined deployment alternative, and allocate the RSS in the cell according to the determined RSS time-frequency resource in the at least one additional cell.

According to this aspect, in some embodiments, determining the deployment alternative further includes determining whether an RSS time-frequency resource used for a first cell is being used for all of a plurality of cells in the radio network. In some embodiments, the processing circuitry is further configured to send an indication of the deployment alternative via a System Information, SI, message in the at least one additional cell. In some embodiments, the processing circuitry is further configured to send an indication about which one or more narrowbands are used for RSS in the radio network via a System information, SI, message in the at least one additional cell. In some embodiments, the time-frequency resource used for the RSS in at least one additional cell is determined based at least in part on a function of a cell identity of the at least one additional cell. In some embodiments, the function is based at least in part on a periodicity of an RSS in the first cell. In some embodiments, determining a deployment alternative includes receiving a message from another network node in the radio network or a core network node serving the radio network node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a flowchart illustrating exemplary methods implemented in a communication system including a host computer, a network node and a wireless device for executing a client application at a wireless device according to some embodiments of the present disclosure;

FIG. 5 is a flowchart illustrating exemplary methods implemented in a communication system including a host computer, a network node and a wireless device for receiving user data at a wireless device according to some embodiments of the present disclosure;

DETAILED DESCRIPTION

Figure 1:
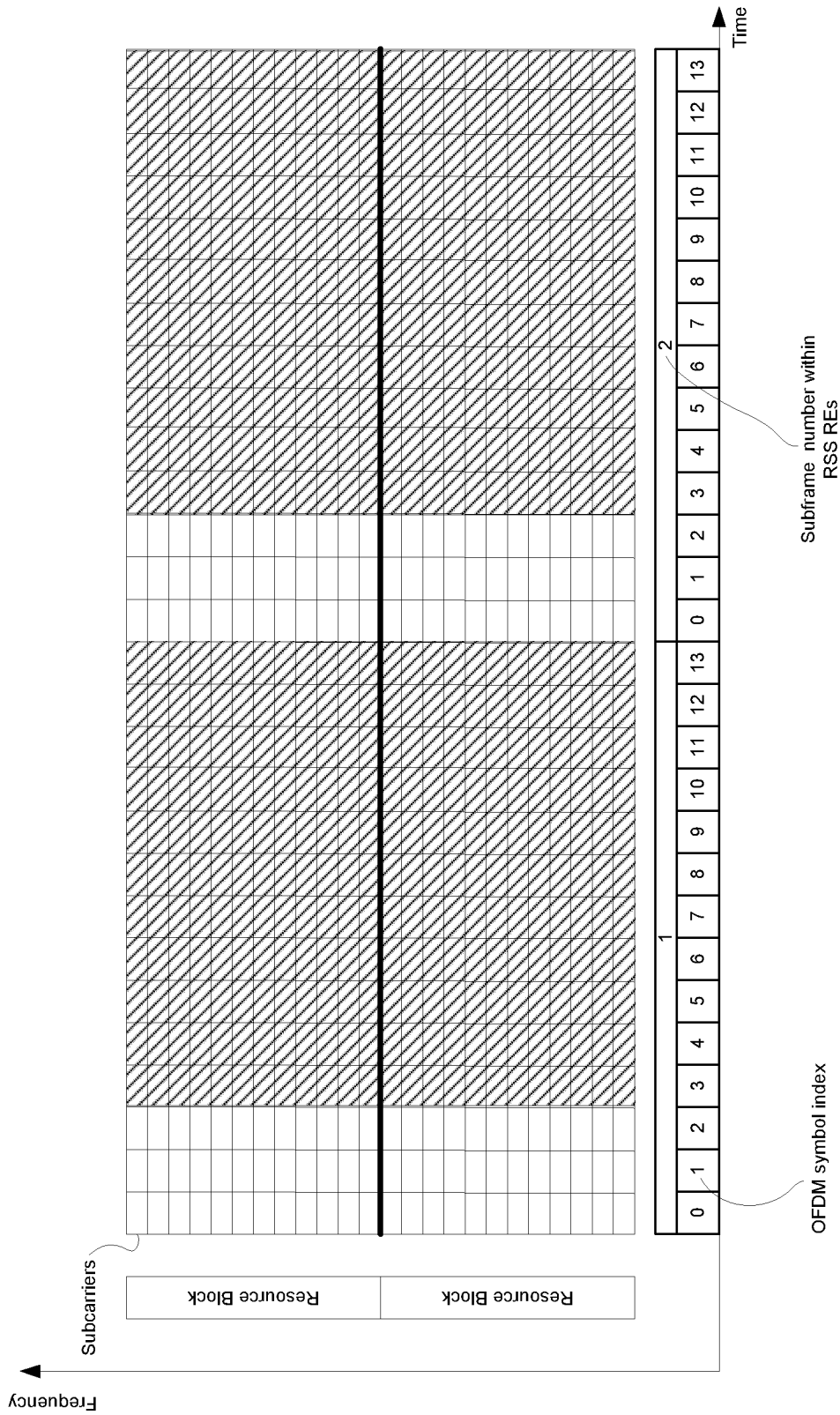
FIG. 1 illustrates an example Time-Frequency Grid of a resynchronization signal (RSS)

At present, a WD synchronizes towards a cell, e.g., a network node, and reads the System Information (SI) in order to obtain the RSS configuration of that cell. In a deep coverage scenario that is typical for Bandwidth reduced Low complexity/Coverage Enhancement (BL/CE) WDs, obtaining the RSS configuration of the cell may be a very power consuming operation. Furthermore, the RSS is very flexibly configured with a possible starting location in the frequency domain in every PRB and in the time domain in every frame. For a WD to use the RSS transmitted by neighbor cells, e.g., for cell search or Radio Resource Management (RRM) measurements, it would be very tedious to blindly search the whole time-frequency space for the RSS. This is so in particular because the RSS targets narrowband machine type communication (MTC) devices. Alternatively, the network can provide neighbor cell RSS information in the SI. However, transmission of neighbor cell RSS configuration parameters is very cumbersome. Hence, the RSS among the cells in a network can be configured such that the network can achieve desirable performance characteristics while at the same time, a WD can predictably detect the location of the RSS for a given cell.

Some embodiments of the present disclosure provide a method, wireless device and network node for configuring an RSS among a number of cells in a wireless communication network such as a cellular network. Such configuration may be used to achieve different network characteristics regarding deployment, e.g., a preference towards efficient detection by WDs, good detection performance or a combination thereof.

Before describing in detail exemplary embodiments, it is noted that the embodiments reside primarily in combinations of apparatus components and processing steps related to configuration of resynchronization signal (RSS) deployment in a wireless communication network. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrow band IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Although the description is explained in the context of RSS, it should be understood that the principles may also be applicable to other similar signals and/or may still be applicable if, for example, a name of the underlying signal is changed in further standards versions.

The allocation of radio resources to the at least one wireless device for communications may be interpreted as the set of resources for certain operations by the at least one wireless device, that have been configured, e.g., preconfigured, by the network node.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Generally, it may be considered that the network, e.g. a signaling radio node and/or node arrangement (e.g., network node), configures a WD, in particular with the transmission resources. A resource may in general be configured with one or more messages. Different resources may be configured with different messages, and/or with messages on different layers or layer combinations. The size of a resource may be represented in symbols and/or subcarriers and/or resource elements and/or physical resource blocks (depending on domain), and/or in number of bits it may carry, e.g. information or payload bits, or total number of bits. The set of resources, and/or the resources of the sets, may pertain to the same carrier and/or bandwidth part, and/or may be located in the same slot, or in neighboring slots.

Receiving (or obtaining) information, such as configuration and/or control information, may comprise receiving one or more control information messages (e.g., alternative deployment information and/or RRC configuration information). It may be considered that receiving control signaling comprises demodulating and/or decoding and/or detecting, e.g. blind detection of, one or more messages, in particular a message carried by the control signaling, e.g. based on an assumed set of resources, which may be searched and/or listened for the control information. It may be assumed that both sides of the communication are aware of the configurations, and may determine the set of resources, e.g. based on the reference size.

An indication (e.g., an indication of e.g., alternative deployment information and/or RRC configuration information, of a table, etc.) generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD) may comprise configuring the WD to perform certain measurements on certain subframes or radio resources and reporting such measurements.

The term time resource used herein may correspond to any type of physical resource or radio resource expressed in terms of length of time. Examples of time resources are: symbol, time slot, subframe, radio frame, TTI, interleaving time, etc. As used herein, in some embodiments, the terms "subframe," "slot," subframe/slot" and "time resource" are used interchangeably and are intended to indicate a time resource and/or a time resource number.

A cell may be generally a communication cell, e.g., of a cellular or mobile communication network, provided by a node. A serving cell may be a cell on or via which a network node (the node providing or associated to the cell, e.g., base station or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC connected or RRC idle state, e.g., in case the node and/or user equipment and/or network follow the LTE-standard. One or more carriers (e.g., uplink and/or downlink carrier/s and/or a carrier for both uplink and downlink) may be associated to a cell.

Any two or more embodiments described in this disclosure may be combined in any way with each other.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
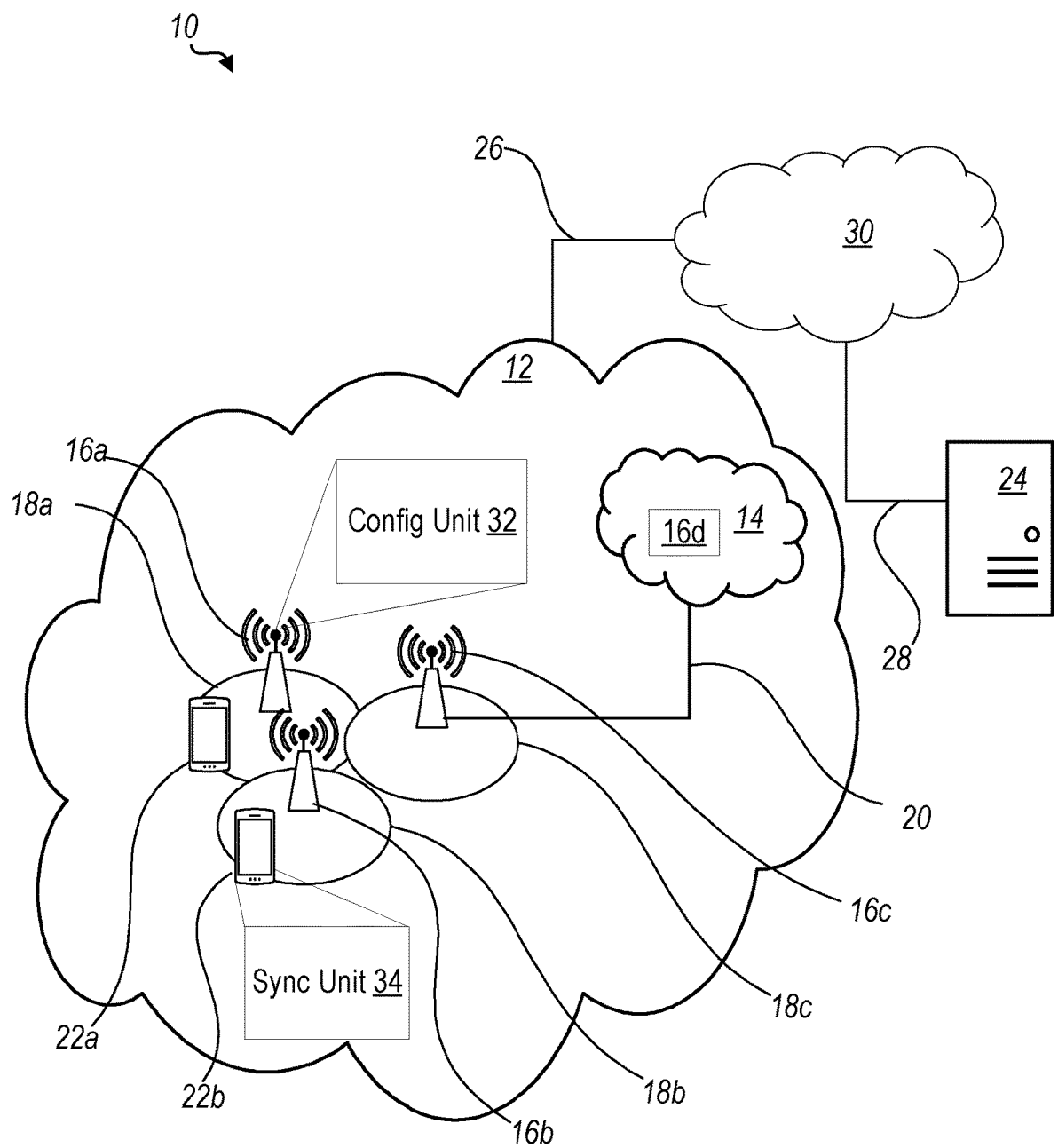
FIG. 2 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. The communication system also includes a core network node 16d shown in the core network 14. The core network node 16d may be connectable to each network node 16a-c over a wired and/or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which may be configured to determine a deployment alternative for a resynchronization signal (RSS), determine information about an RSS time-frequency resource in at least one additional cell served by the network node 16, the determining of information about the RSS time-frequency resource being based at least in part on the determined deployment alternative. The deployment alternatives are discussed in detail below. Optionally, the configuration unit 32 is configured to allocate the RSS according to the determined RSS time-frequency resource in the at least one additional cell. In some embodiments, configuration unit 32 may be configured to determine an RSS configuration (e.g., frequency location, PRB, periodicity, duration, time offset, etc. for the RSS), and the RSS configuration based at least in part on the determined deployment alternative. Further, optionally, e.g., if the network node 16 is a radio network node such as a base station, configuration unit 32 may be configured to allocate the RSS according to the determined RSS configuration.

In some embodiments, a wireless device 22 is configured to include a synchronization unit 34 which is configured to determine a deployment alternative for a resynchronization signal (RSS); determine information about an RSS time-frequency resource used in a second cell based at least in part on the determined deployment alternative; and detect the RSS in the second cell using the determined information about the RSS time-frequency resource information used for the RSS in the second cell. In some embodiments, the synchronization unit 34 is configured to determine a deployment alternative for a resynchronization signal (RSS); determine an RSS configuration, the RSS configuration based at least in part on the determined deployment alternative; and detect the RSS in a cell using the RSS configuration. Here the RSS configuration may include, in addition to a time-frequency resource of the RSS, a periodicity, duration, time offset, etc. for the RSS.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 which is configured to determine a deployment alternative for a resynchronization signal (RSS); determine information about an RSS time-frequency resource in at least one additional cell served by the network node 16, the determining of information being based at least in part on the determined deployment alternative; and optionally, allocate the RSS according to the determined RSS time-frequency resource in the at least one additional cell. In some embodiments the configuration unit 32 may be configured to determine a deployment alternative for a resynchronization signal (RSS). Configuration unit 32 may be configured to determine an RSS configuration (e.g., frequency location, PRB, periodicity, duration, time offset, etc. for the RSS), the RSS configuration based at least in part on the determined deployment alternative. Further, optionally, e.g., if the network node 16 is a radio network node such as a base station, configuration unit 32 may be configured to allocate the RSS according to the determined RSS configuration.

On the other hand, in some embodiments, if, for example, the network node 16 is an MME, configuration unit 32 may not perform allocation of the RSS, but instead may transmit the deployment alternative and/or the RSS configuration information to other network nodes 16, such as base stations, which may then perform the allocation accordingly. Although FIG. 2 depicts configuration unit 32 in network node 16a, there may also be a configuration unit 32 present in core network node 16d, which may be configured to perform some or all of the processes described herein with reference to network node 16.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include synchronization unit 34 which is configured to determine a deployment alternative for a resynchronization signal (RSS); determine information about an RSS time-frequency resource used in a second cell based at least in part on the determined deployment alternative; and detect the RSS in the second cell using the determined information about the RSS time-frequency resource information used for the RSS in the second cell. In some embodiments, the synchronization unit 34 is configured to determine a deployment alternative for a resynchronization signal (RSS) (e.g., by receiving an indication from network node 16); determine an RSS configuration, the RSS configuration based at least in part on the determined deployment alternative (e.g., by receiving an indication from network node 16 and/or making a self-determination based on e.g., a formula and/or the determined deployment alternative); and detect the RSS in a cell using the RSS configuration (e.g., time and/or frequency resource and/or PRB). Here again, the RSS configuration may include, in addition to a time-frequency resource, a periodicity, duration, time offset, etc., for the RSS.

Figure 3:
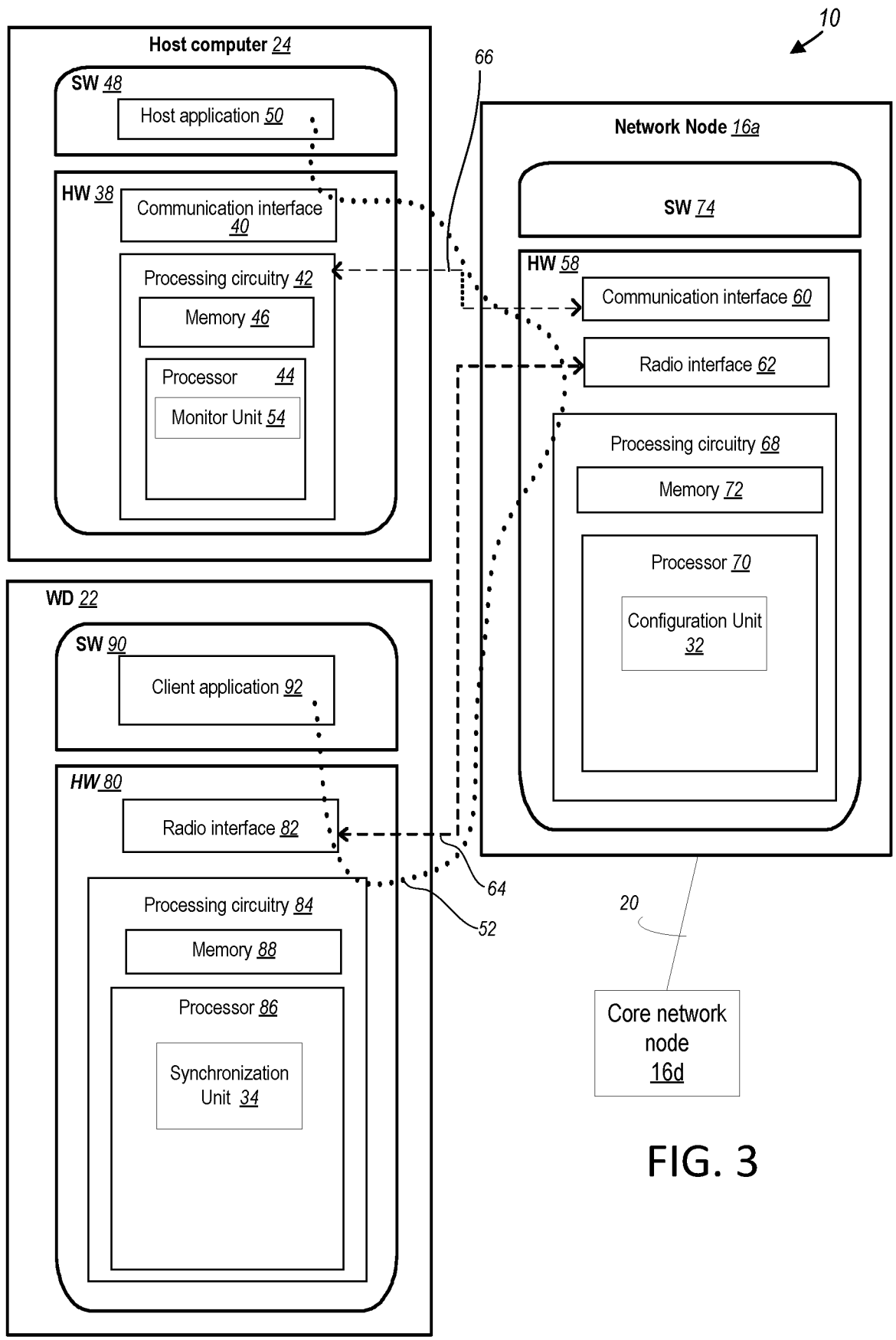
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as configuration unit 32, and synchronization unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 6:
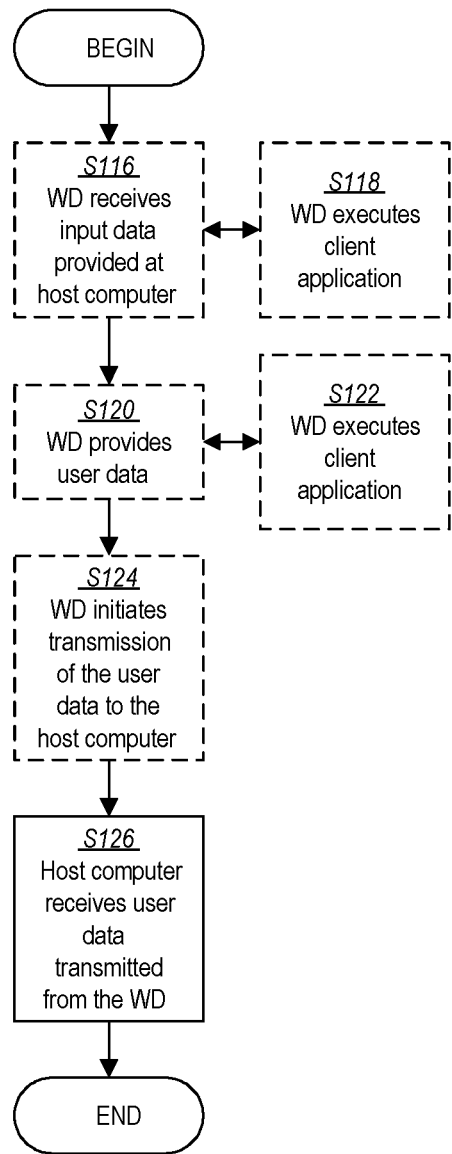
FIG. 6 is a flowchart illustrating exemplary methods implemented in a communication system including a host computer, a network node and a wireless device for receiving user data from the wireless device at a host computer according to some embodiments of the present disclosure.

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 7:
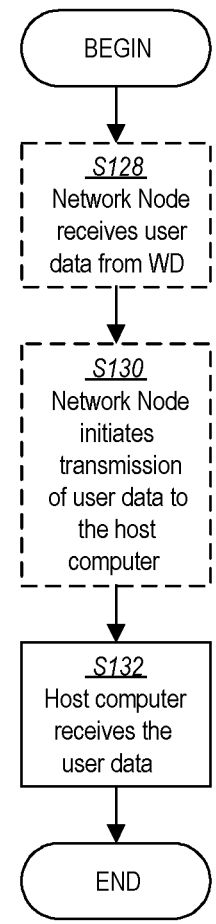
FIG. 7 is a flowchart illustrating exemplary methods implemented in a communication system including a host computer, a network node and a wireless device for receiving user data at a host computer according to some embodiments of the present disclosure.

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
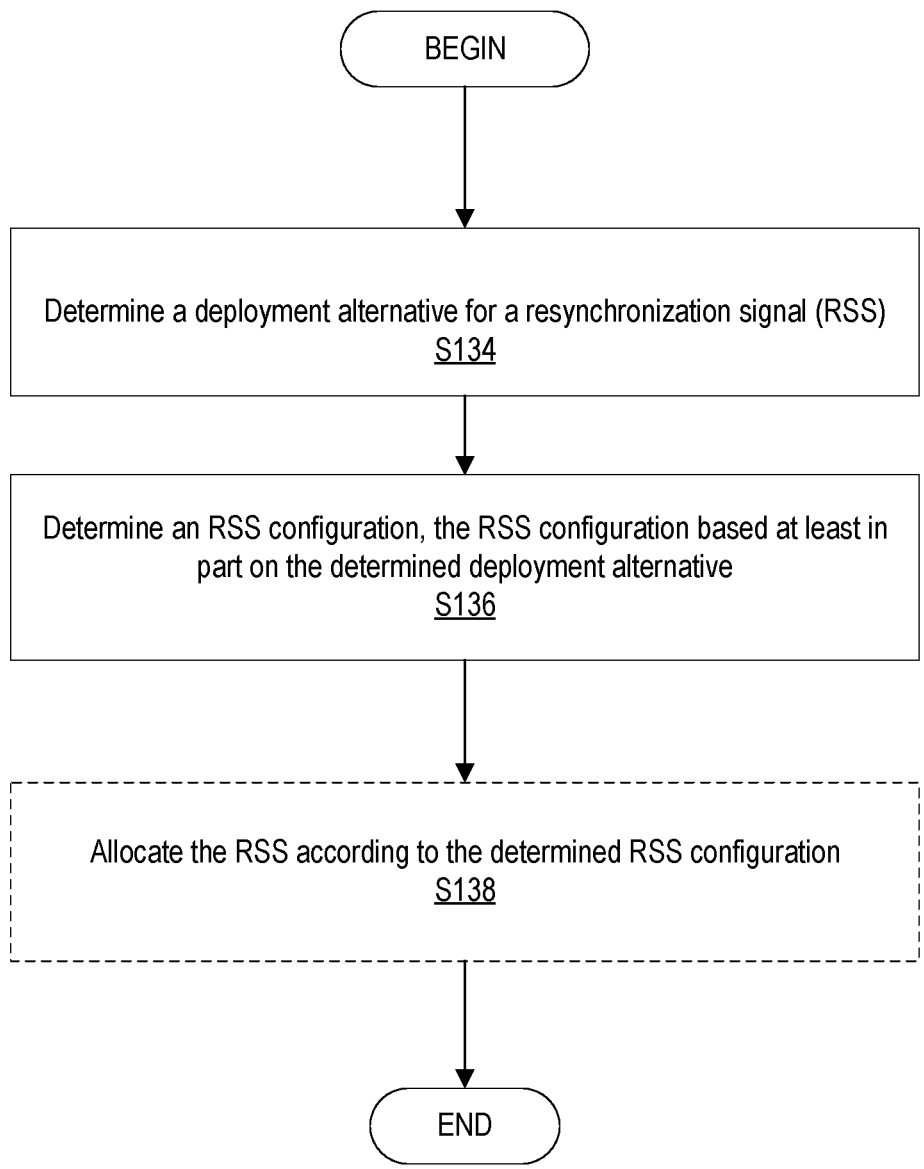
FIG. 8 is a flowchart of an exemplary process in a network node for configuring an RSS according to some embodiments of the present.

FIG. 8 is a flowchart of an exemplary process in a network node 16 for configuration of resynchronization signal (RSS) deployment in a cellular network according to some embodiments of the present disclosure. One or more Blocks and/or functions and/or methods performed by the network node 16 may be performed by one or more elements of network node 16 such as by configuration unit 32 in processing circuitry 68, processor 70, radio interface 62, etc. according to the example method. The example method includes determining (Block S134), such as via configuration unit 32, processing circuitry 68, processor 70, radio interface 62, a deployment alternative for a resynchronization signal (RSS). The method includes determining (Block S136), such as via configuration unit 32, processing circuitry 68, processor 70, radio interface 62, an RSS configuration, the RSS configuration based at least in part on the determined deployment alternative. The method optionally includes allocating (Block S138), such as via configuration unit 32, processing circuitry 68, processor 70, radio interface 62, the RSS according to the determined RSS configuration.

In some embodiments, determining the deployment alternative further includes selecting, such as via configuration unit 32, processing circuitry 68, processor 70, and/or radio interface 62, the deployment alternative from a set of deployment alternatives, the set including one or more of: collocation of the RSS in the same time-frequency resource for all cells in a network; a unique allocation of the RSS within a narrowband; a unique allocation of the RSS within a number of narrowbands; and a unique allocation of the RSS within a carrier. In some embodiments, the method further includes transmitting an indication of the deployment alternative via one of a System Information (SI) message to a wireless device 22 and an S1 interface to another network node 16. In some embodiments, one or more of: the RSS time-frequency resource configurations may further be based at least in part on a cell identity (ID) of the cell. In some embodiments, the RSS time-frequency configuration parameters are mapped to cell ID and RSS time-frequency resources (locations). In some embodiments, the RSS configuration may further be based at least in part on a formula. In some embodiments, the RSS configuration includes a time and/or frequency resource and/or a physical resource block for the RSS.

Figure 9:
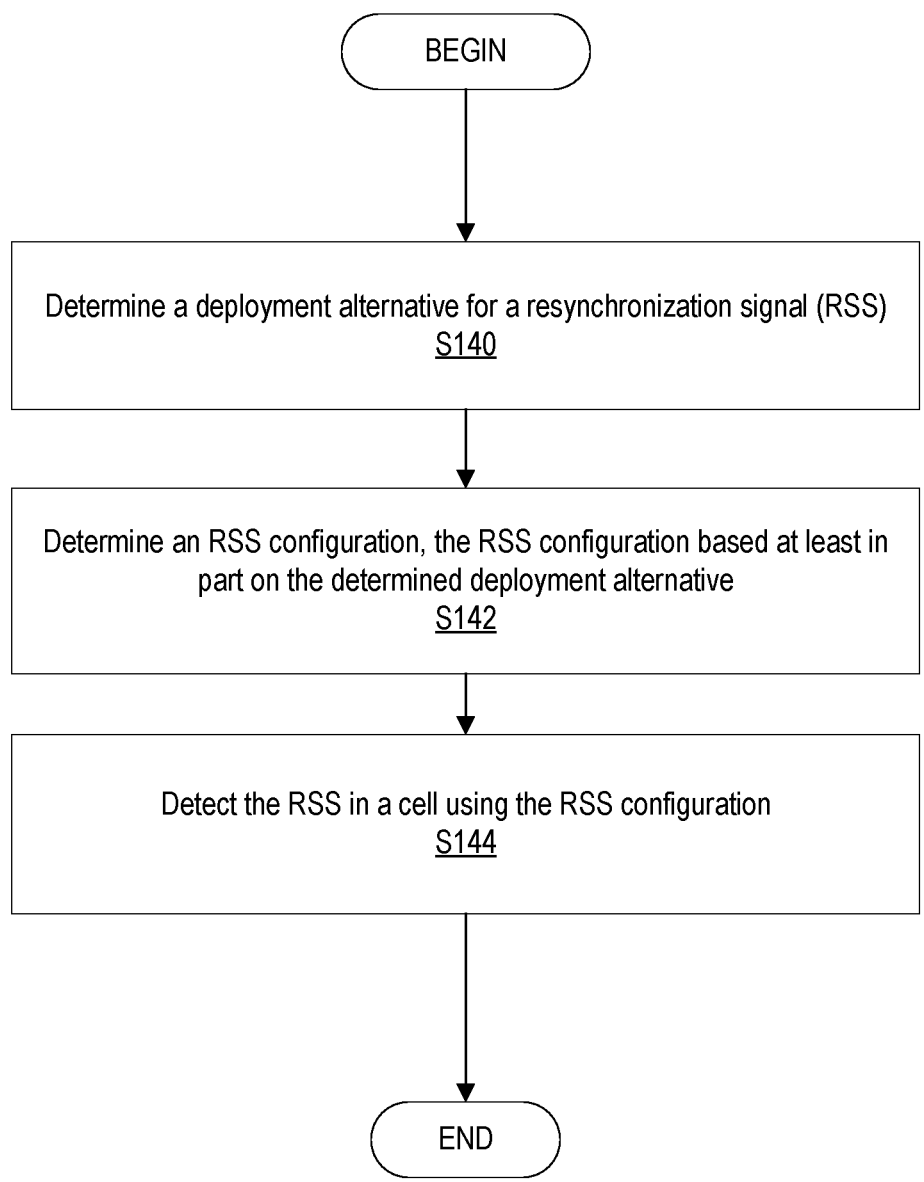
FIG. 9 is a flowchart of an exemplary process in a wireless device for detecting the RSS in a cell using the RSS configuration according to some embodiments of the present disclosure.

FIG. 9 is a flowchart of an exemplary process in a wireless device 22 for configuration of resynchronization signal (RSS) deployment in a cellular network according to some embodiments of the present disclosure. One or more Blocks and/or functions and/or methods performed by WD 22 may be performed by one or more elements of WD 22 such as by synchronization unit 34 in processing circuitry 84, processor 86, radio interface 82, etc. The example method includes determining (Block S140), such as via synchronization unit 34, processing circuitry 84, processor 86, radio interface 82, a deployment alternative for a resynchronization signal (RSS). The method includes determining (Block S142), such as via synchronization unit 34, processing circuitry 84, processor 86, radio interface 82, an RSS configuration, the RSS configuration based at least in part on the determined deployment alternative. The method includes detecting (Block S144), such as via synchronization unit 34, processing circuitry 84, processor 86, radio interface 82, the RSS in a cell using the RSS configuration.

In some embodiments, determining the deployment alternative further includes selecting the deployment alternative from a set of deployment alternatives, the set including one or more of: collocation of the RSS in the same time-frequency resource for all cells in a network; a unique allocation of the RSS within a narrowband; a unique allocation of the RSS within a number of narrowbands; and a unique allocation of the RSS within a carrier. In some embodiments, the method further includes receiving, such as via synchronization unit 34, processing circuitry 84, processor 86, radio interface 82, an indication of the deployment alternative via a System Information (SI) message. In some embodiments, one or more of: the RSS configuration is further based at least in part on a cell identity (ID) of the cell; the RSS configuration is further based at least in part on a formula; and the RSS configuration indicates a time and/or frequency resource and/or a physical resource block for the RSS.

Having described the general process flow of arrangements of the disclosure and having provided examples of hardware and software arrangements for implementing the processes and functions of the disclosure, which may be implemented by network node 16 and/or wireless device 22 the sections below provide details and examples of arrangements for configuration of resynchronization signal (RSS) deployment in a cellular network.

There are at least three general aspects of the present disclosure, a radio network node or eNB aspect, a network device or WD aspect, and a core network node or MME aspect. The term "network node 16" is used herein to refer primarily to a radio network node unless otherwise indicated.

Radio Network Node

The radio network node 16 may provide a method for deploying the resynchronization signal (RSS) within the network. There are good reasons why such deployment should be configurable. For example, the RSS has not been evaluated sufficiently well for its detection performance to be known for all kinds of deployments. Such deployments could be, e.g., collocation among cells, partially overlapping among cells, in either time or frequency or both, or completely orthogonal, i.e., non-overlapping in both time and frequency. Benefits with collocation could be that the WD 22 may only search a minimal space to identify RSS, reducing WD 22 power consumption. However, the risk is that detection performance may turn out to be worse due to cross-correlation properties among RSSs for different cells. The other deployments could to varying degrees present less efficient RSS search but also better cross correlation properties among RSSs for different cells. In some aspects, it may be desirable that the network has a limited set of configuration alternatives, since then the WD 22 detection complexity may be smaller.

Figure 10:
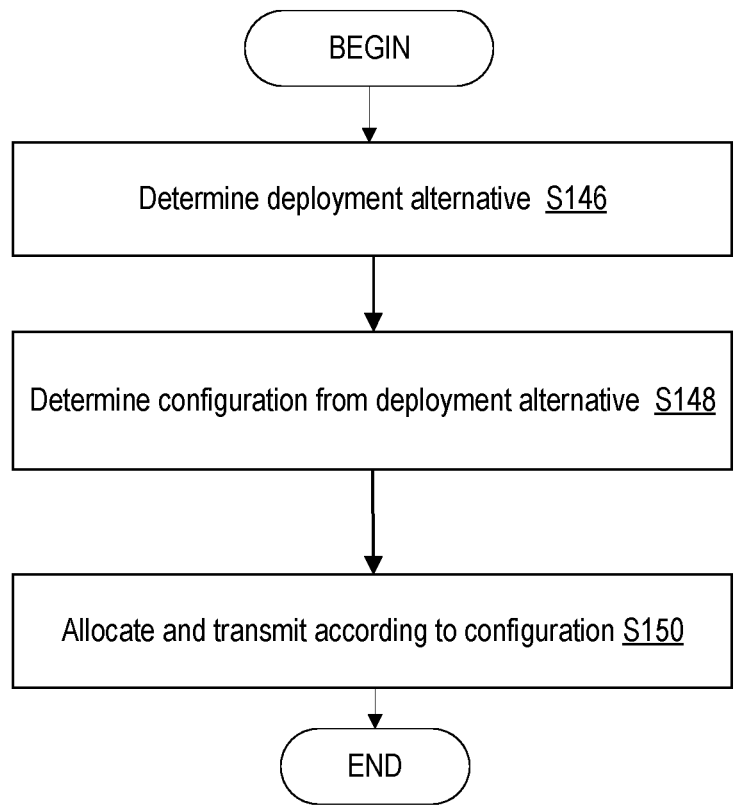
FIG. 10 is a flowchart of an exemplary process in a network node for allocation according to a configuration based on a deployment alternative according to some embodiments of the present disclosure.

One example process for allocation according to a configuration based on a deployment alternative is described with reference to FIG. 10. In FIG. 10, the first step (Block S146) of the method is to determine the deployment alternative. The determined deployment alternative can either be signaled to the node (e.g., wireless device 22 and/or network node 16) or read from a configuration file or similar in memory on the node.

In one embodiment, there are up to four possible deployment alternatives, each alternative representing different degrees of coordination of the RSS transmissions between different cells, as follows:

A first deployment alternative where RSSs of all cells (configured with RSS) in the network are collocated in the same time-frequency resource;

A second deployment alternative where RSSs of cells are located on a specific time-frequency resource within a narrowband;

A third deployment alternative where RSSs of cells are located on a specific time-frequency resource within a number of narrowbands; and A fourth deployment alternative where RSSs of cells are located on a specific time-frequency resource within the carrier.

These four RSS deployment alternatives can be represented by two bits, which may, for example, be broadcast in System Information from the network node 16. If only one or two deployment options are to be communicated only one bit may be used. As a non-limiting example of using only one bit, one of the bit values can be used to represent deployment alternative 1 above, and the other value can be used to represent any (combination of) the deployment alternatives 2-4.

In one embodiment, the signaling of RSS deployment alternative(s) is realized in a field, e.g., being an extension to the RSS-Config-r15 information element of the 3GPP technical specifications.

In a related embodiment, the signaling of deployment alternative(s) in System information is optional, such that if the network node 16 does not signal the deployment alternative, no particular structure or pattern of the RSS configuration in different cells can be assumed. This would, for example, correspond to the situation using the RSS configuration specified within Rel-15.

In the second step (Block S148), the node (e.g., WD 22 and/or network node 16) determines the RSS configuration based on the configured deployment alternative. Such determination could differ depending on which deployment alternative was configured. The configuration could be determined again from signaling or reading the configuration from a file (e.g., in memory on the node), e.g., for the collocated alternative. Alternatively, the configuration could be based on a mathematical expression, a table or a list, for example. Another alternative is that the configuration depends on both signaling or reading from a file, and a mathematical formula (a function). For example, information indicating the narrowband(s) for RSS(s) could be signaled or read, whereas the exact location within the narrowband(s) is determined by a mathematical formula (e.g., by WD 22 and/or network node 16). In one embodiment, the mathematical expression or table could be based on the cell ID of the node (e.g., WD 22 and/or network node 16). In another embodiment, the mathematical expression could be based on the signal period, periodicity of the RSS (PRSS) or the signal duration, duration of RSS (DRSS). Thus, in some embodiments, the mathematical expression may be a function of a cell identity and/or a function of signal periodicity of the RSS. These may be used to control the level of overlap that is desirable for a certain deployment alternative.

Many different possibilities for mathematical expressions that are possible to use for such configuration have been considered. The below expressions may serve as non-limiting examples depending on the deployment alternative:

For the second deployment (from the four possible deployment alternatives described herein above), an example expression may include:
PRB=mod(cell_id, 5)
or
PRB=2 mod(cell_id, 3)

where a cell_id is a cell identity, mod refers to a "modulo 2" operation, and where the calculated PRB refers to a PRB index indicating the lowest PRB index of the RSS among the 6 PRBs within one narrowband. Resources are allocated and the configuration is transmitted according to the determined configuration (Block S150).

Figure 11:
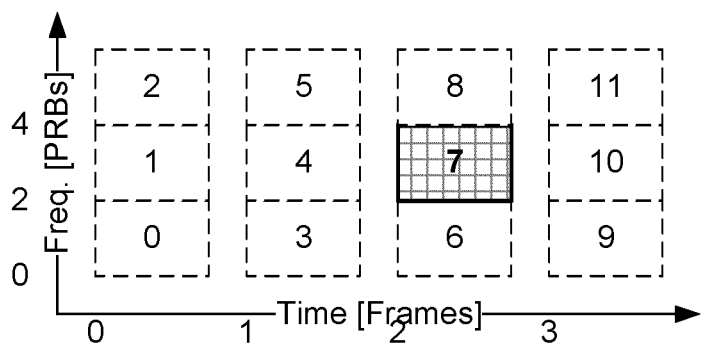
FIG. 11 illustrates an example deployment in one narrowband where the location of cell ID 7 is highlighted according to some embodiments of the present disclosure.

FIG. 11 illustrates an example deployment in one narrowband using the expression PRB=2 mod(cell_id, 3), where the location of the cell ID 7 is highlighted.

For the third deployment, assuming the number of narrowbands within which the RSS for different cells are located equals NNB, an example expression may include:
PRB=mod(cell_id, 6*NNB−1);
where the calculated PRB refers to a PRB index among the 6*NNB PRBs within the narrowbands.

Figure 12:
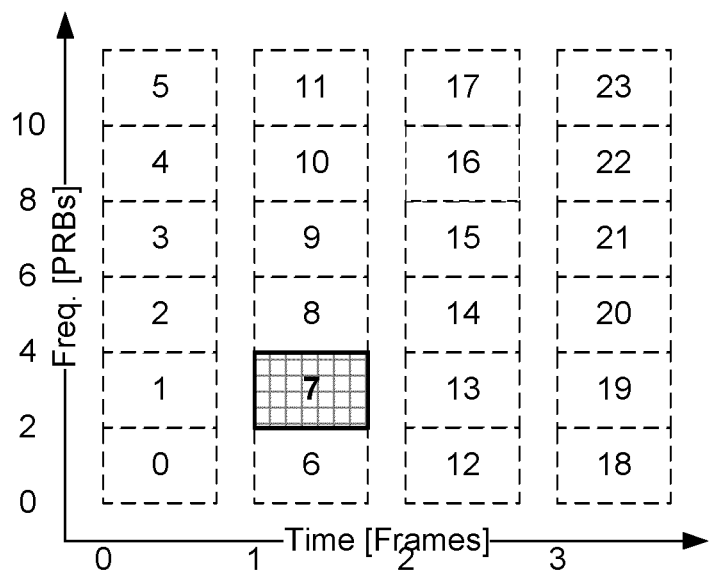
FIG. 12 illustrates another example deployment in two narrowbands highlighting cell ID 7 according to some embodiments of the present disclosure.

FIG. 12 illustrates an example deployment for a case where the RSS is located within two narrowbands, where the location of the cell ID 7 is highlighted.

For the fourth deployment, for a carrier with PRB bandwidth of NPRB, an example expression may include:
PRB=mod(cell_id, NPRB—1).

For all deployments, assuming NPRB is the available number of PRBs in any deployment alternative, DRSS is the configured RSS duration and PRSS is the RSS periodicity, an example expression may include:

Frame=DRSS mod(round(cell_id/NPRB),PRSS/DRSS).

The time scales used in FIGS. 11 and 12 serve as an illustration only. The time allocation for a particular RSS can be both fractions and multiples of radio frames.

In some embodiments, the values of PRSS and DRSS to be used in the formulas above, or otherwise for the determination of the frequency and/or time location of the RSS in a particular cell, may be the same values of PRSS and DRSS that are used for transmitting RSS in the serving/camping cell controlled by the network node 16. In alternative embodiments, separate values to be used for PRSS and DRSS for the determination of frequency and/or time location of the RSS are signaled or set to predefined values, e.g., specified in a standards document. This latter embodiment can be particularly useful if different timings are used for RSS in different cells in the network.

As mentioned above, in a third step of FIG. 10, Block 150, the synchronization signal (e.g., RSS) is allocated and/or transmitted (e.g., by network node 16) according to the determined configuration. The third step may also include transmitting (e.g., by network node 16) configuration information related to which deployment alternative is selected and further information about the configuration of the deployment alternative.

Since the deployment alternative can be used network wide, the radio network nodes (e.g., network node 16) may use some inter-network node communication in order to determine what RSS configuration or deployment alternative to use. In some embodiments, this may be performed from a network management system module configuring all radio network nodes 16, separately. In other embodiments, the network node 16 can determine the RSS configuration or deployment alternative to use via communication directly between the network nodes 16*a-b*, e.g., via the X2 interface using a standardized message exchange, or via a proprietary communication interface. In yet other embodiments, the network node 16 can determine the RSS configuration or deployment alternative to use via communication with a core network node 16, such as a Mobility Management Entity (MME) over the S1 interface using a standardized message exchange, or via a proprietary communication interface.

Wireless Device

Figure 13:
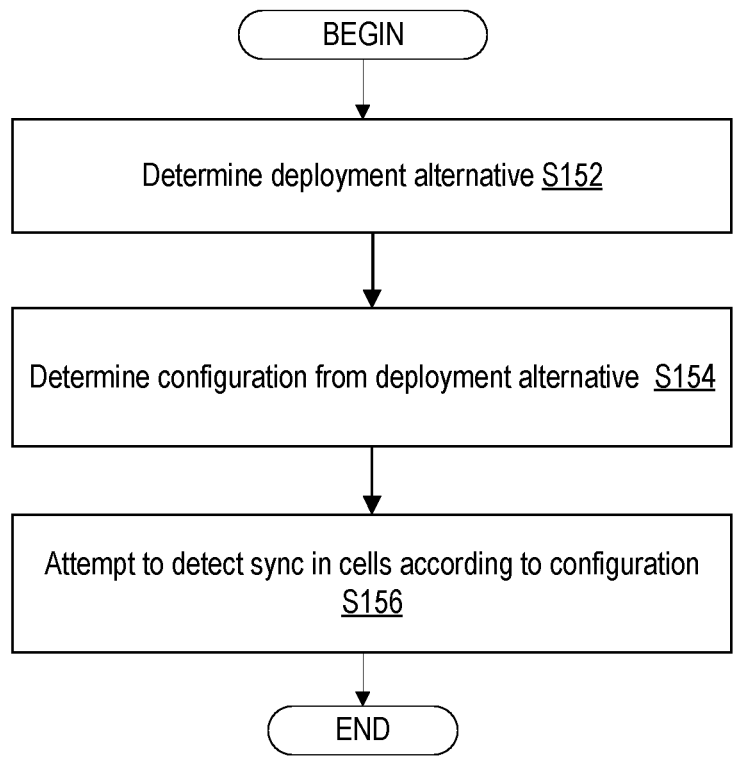
FIG. 13 is a flowchart of an exemplary process in a WD for synchronization detection attempts according to some embodiments of the present disclosure.

The wireless device operation may be considered to mirror the radio network node operation just described (e.g., signals transmitted by network node 16 and received by a WD 22 and vice versa). Some embodiments in this aspect provide for a method in a wireless device for detecting a periodic resynchronization signal (RSS) in a cell, such as a neighbor cell, according to the following example method. FIG. 13 is a flowchart of an exemplary process in a wireless device for synchronization detection attempts according to some embodiments of the present disclosure.

In a first step (Block S152) of the example method, the WD 16 determines a deployment alternative, according to the deployment alternatives above. The deployment alternative is typically communicated via broadcast system information from the cell the WD 22 is camping on, or, if in active mode, via dedicated radio resource control (RRC) signaling by the serving cell.

In a second step (Block S154), the WD 16 determines the configuration based on the deployment alternative. In case the collocated deployment alternative is selected, the WD 22 may obtain the configuration from reading the RSS configuration of the camping or serving cell. For other deployment alternatives, the configuration may be determined by a mathematical expression or a combination of system information and a mathematical expression.

In the third step (Block S156), the WD 16 may attempt to detect the synchronization signal (e.g., RSS) of a cell, based on the determined configuration. The cell may be a known neighbor cell or detection may be blind such that the neighbor cells are unknown and thus hypothesized.

Core Network Node

For purposes of distinguishing a core network node from the radio network node described above, the core network node will be indicated by 16*d* and a radio network node will be indicated by 16*a* in the singular or 16*a-c* in the plural, as illustrated in the communication system 10 in FIG. 2.

The core network node 16*d*, such as an MME, communicates information indicating what RSS configuration or deployment alternative to use to radio network nodes 16*a-c* in the network. This can be performed over the S1 interface using a standardized message exchange, or via a proprietary communication interface. In some embodiments, this communication is performed by the core network node 16*d* configuring the radio network nodes 16*a-c*. In other embodiments, the communication is performed by the core network node 16*d* responding to a request from the radio network node 16*a* about the RSS configuration or deployment alternative to use.

Figure 14:
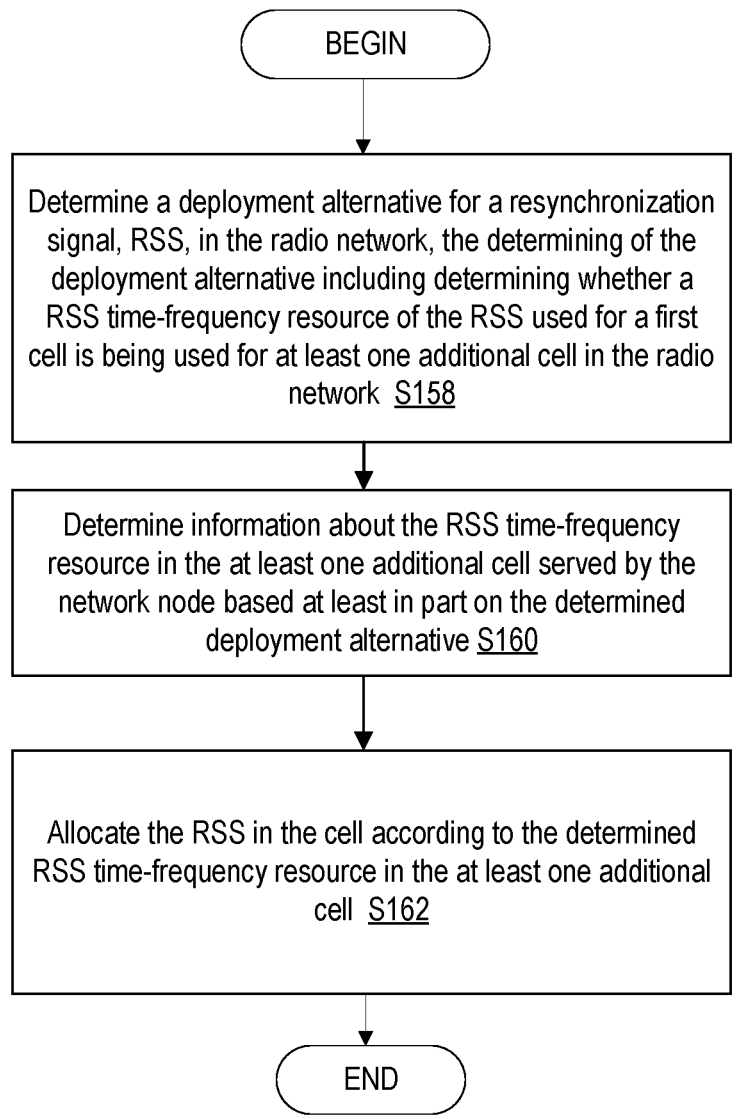
FIG. 14 is a flowchart of an exemplary process in a network node for allocating RSS in a cell according to principles set forth herein.

FIG. 14 is a flowchart of an exemplary process in a network node 16 for allocating RSS in a cell according to principles set forth herein. The process can be performed by the processing circuitry 68, processor 70 (including the configuration unit 32) and/or the radio interface 62. The process includes determining a deployment alternative for a resynchronization signal, RSS, in the radio network, the determining of the deployment alternative including determining whether a RSS time-frequency resource used for a first cell is being used for at least one additional cell in the radio network (Block S158). The process also includes determining information about the RSS time-frequency resource in the at least one additional cell served by the network node based at least in part on the determined deployment alternative (Block S160). The process also includes allocating the RSS in the at least one additional cell according to the determined information about the RSS time-frequency resource in the at least one additional cell (S162).

Figure 15:
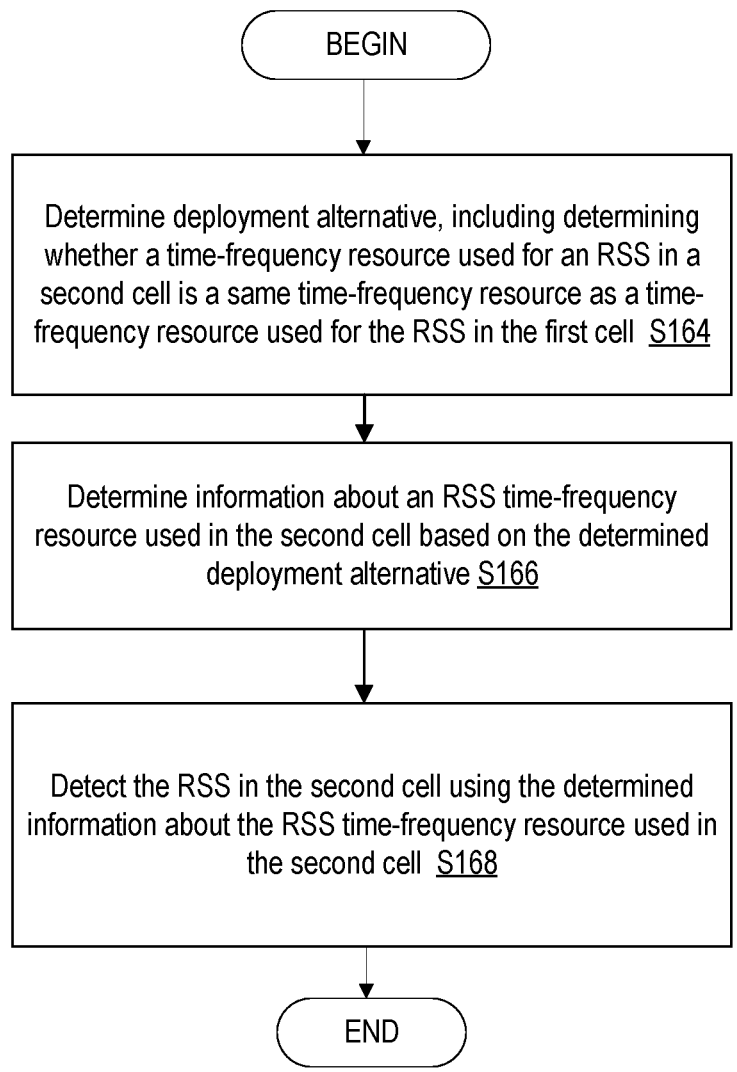
FIG. 15 is a flowchart of an exemplary process in a wireless device for detecting RSS in a cell according to principles set forth herein.

FIG. 15 is a flowchart of an exemplary process in a WD 22 for detecting RSS in a cell using determined RSS time-frequency resource information. The process may be performed by the processing circuitry 84, processor 86 (including synchronization unit 34) and/or radio interface 82. The process includes determining a deployment alternative for a resynchronization signal, RSS, in the radio network, the determining of the deployment alternative including determining whether a time-frequency resource used for an RSS in the second cell is a same time-frequency resource as a time-frequency resource used for an RSS in the first cell (S164). The process also includes determining information about an RSS time-frequency resource used in a second cell in the radio network based at least in part on the determined deployment alternative (Block S166). The process further includes detecting the RSS in the second cell using the determined information about the RSS time-frequency resource used in the second cell (Block S168).

Thus, according to one aspect, a method implemented in a wireless device, WD 22, configured to wirelessly connect to a first cell in a radio network is provided. The method includes determining, via the processing circuitry 84, a deployment alternative for a resynchronization signal, RSS, in the radio network. The determining of the deployment alternative includes determining whether a time-frequency resource used for an RSS in a second cell in the radio network is a same time-frequency resource as a time-frequency resource used for an RSS in the first cell. The method includes determining, via the processing circuitry 84, information about an RSS time-frequency resource used in a second cell in the radio network based at least in part on the determined deployment alternative. The method also includes detecting, via the processing circuitry 84, the RSS in the second cell using the determined information about the RSS time-frequency resource used in the second cell.

According to this aspect, in some embodiments, the method further includes performing, via the processing circuitry 84 and radio interface 82, one or more measurements using the detected RSS in the second cell. In some embodiments, determining the deployment alternative comprises receiving an indication of the deployment alternative via a System Information, SI, message. In some embodiments, the method further includes, when the determining of the deployment alternative indicates that the time-frequency resource used for the RSS in the first cell is different from the time-frequency resource used for the RSS in the second cell, receiving, via the radio interface 82, an indication of which one or more narrowbands are used for RSS in the radio network via a System Information, SI, message. In some embodiments, the determining of the deployment alternative indicates that the time-frequency resource used for the RSS in the first cell is different from the time-frequency resource used for the RSS in the second cell, then at least one of a time and a frequency of the time-frequency resource used for the RSS in the second cell is determined based at least in part on a function of a cell identity of the second cell. In some embodiments, the function is based at least in part on a periodicity of an RSS in the first cell.

According to another aspect, a WD 22 wirelessly connected to a first cell in a radio network is provided. The WD 22 incudes processing circuitry 84 configured to determine a deployment alternative for a resynchronization signal, RSS, in the radio network, the determining of the deployment alternative including determining whether a time-frequency resource used for an RSS in a second cell in the radio network is a same time-frequency resource as a time-frequency resource used for the RSS in the first cell. The processing circuitry 84 is further configured to determine information about the RSS time-frequency resource used in the second cell in the radio network based at least in part on the determined deployment alternative. The processing circuitry 84 is further configured to detect the RSS in the second cell using the determined information about the RSS time-frequency resource used for the RSS in the second cell.

According to this aspect, in some embodiments, the processing circuitry 84 is further configured to perform one or more measurements using the detected RSS in the second cell. In some embodiments, determining a deployment alternative comprises receiving an indication of the deployment alternative via a System Information, SI, message. In some embodiments, the processing circuitry 84 is further configured to, when the determining of the deployment alternative indicates that the time-frequency resource used for the RSS in the first cell is different from the time-frequency resource used for the RSS in the second cell, receiving an indication of which one or more narrowbands are used for RSS in the radio network via a System Information, SI, message. In some embodiments, when the determining of the deployment alternative indicates that the time-frequency resource used for the RSS in the first cell is different from the time-frequency resource used for the RSS in the second cell, then at least one of a time and a frequency of the time-frequency resource used for the RSS in the second cell is determined based at least in part on a function of a cell identity of the second cell. In some embodiments, the function is based on a periodicity of an RSS in the first cell.

According to yet another aspect, a method in a network node 16 configured to serve multiple cells in a radio network is provided. The method includes determining, via the processing circuitry 68 a deployment alternative for a resynchronization signal, RSS, in the radio network, the determining of the deployment alternative including determining whether a RSS time-frequency resource used for a first cell in the radio network is being used for at least one additional cell in the radio network. The method includes determining, via the processing circuitry 68, information about the RSS time-frequency resource in the at least one additional cell served by the network node based at least in part on the determined deployment alternative. The method includes allocating, via the processing circuitry 68, the RSS in the at least one additional cell according to the determined information about the RSS time-frequency resource in the at least one additional cell.

According to this aspect, in some embodiments, determining the deployment alternative further includes determining whether an RSS time-frequency resource used for a first cell is being used for all of a plurality of cells in the radio network. In some embodiments, the method further includes sending an indication of the deployment alternative via a System Information, SI, message in the at least one additional cell. In some embodiments, the method includes sending an indication about which one or more narrowbands are used for RSS in the radio network via a System information, SI, message in the at least one additional cell. In some embodiments, the time-frequency resource used for the RSS in at least one additional cell is determined based at least in part on a function of a cell identity of the at least one additional cell. In some embodiments, the function is based on a periodicity of an RSS in the first cell. In some embodiments, determining a deployment alternative includes receiving, via the radio interface 62, a message from another network node in the radio network or a core network node serving the radio network node.

According to another aspect, a network node 16 configured to serve multiple cells in a radio network. The network node 16 includes processing circuitry 68 configured to determine a deployment alternative for a resynchronization signal, RSS, in the radio network. The determining of the deployment alternative includes determining whether an RSS time-frequency resource of the RSS used for a first cell in the radio network is being used for at least one additional cell in the radio network. The processing circuitry 68 is further configured to determine information about the RSS time-frequency resource in the at least one additional cell served by the network node based at least in part on the determined deployment alternative, and allocate the RSS in the cell according to the determined RSS time-frequency resource in the at least one additional cell.

According to this aspect, in some embodiments, determining the deployment alternative further includes determining whether an RSS time-frequency resource used for a first cell is being used for all of a plurality of cells in the radio network. In some embodiments, the processing circuitry 68 is further configured to send an indication of the deployment alternative via a System Information, SI, message in the at least one additional cell. In some embodiments, the processing circuitry 68 is further configured to send an indication about which one or more narrowbands are used for RSS in the radio network via a System information, SI, message in the at least one additional cell. In some embodiments, the time-frequency resource used for the RSS in at least one additional cell is determined based at least in part on a function of a cell identity of the at least one additional cell. In some embodiments, the function is based on a periodicity of an RSS in the second cell. In some embodiments, determining a deployment alternative includes receiving a message from another network node in the radio network or a core network node serving the radio network node.

In addition, some embodiments may include one or more of the following:
Method 1: A method in a wireless network node (e.g., network node 16) for deploying a periodic (re)synchronization signal in a cellular network, the method comprising:
  a. Determining a deployment alternative;
  b. Determining a configuration based on the deployment alternative; and
  c. Allocating the sync signal according to the determined configuration.
Method 2: Method 1 and where the deployment alternative is either signaled or read from a file.
Method 3: Methods 1-2 and where a first deployment alternative is collocation of the synchronization signal to the same time-frequency resource for all cells in the network.
Method 4: Method 3 and where the configuration is further signaled or read from a file.
Method 5: Methods 1-3 and where a second deployment alternative is a unique allocation of the sync signal within a narrowband. In some embodiments, unique means a unique set of locations having different cell IDs.
Method 6: Methods 1-3 and where a third deployment alternative is a unique allocation of the synchronization signal within a number of narrowbands.

Method 7: Method 6 and where the number of narrowbands is either signaled or read from a file.

Method 8: Methods 1-4 and where a fourth deployment alternative is a unique allocation of the synchronization signal within the carrier.

Method 9: Methods 5-9 and where the configuration is based on a mathematical formula or a table or list.

Method 10: Method 9 and where the formula or table entry is based on the cell id of the node.

Method 11: Methods 9-10 and where the formula or table entry is further determined by the signal period or signal duration.

Method 12: Method 11 and where the unique configuration provides the frequency resource PRB as PRB=mod (cell_id, 5) for the second deployment.

Method 13: Method 11 and where the unique configuration provides the frequency resource PRB as PRB=mod (cell_id, 6*$N_{NB}$-1) for the third deployment.

Method 14: Method 11 and where the unique configuration provides the frequency resource PRB as PRB=mod (cell_id, $N_{PRB}$-1) for the fourth deployment.

Method 15: Method 11 and where the unique configuration provides the time resource frame as Frame=$D'_{RSS}$ mod(round(cell_id/3),$P_{RSS}/D_{RSS}$).

Method 16: A method in a wireless device (e.g., WD 22) for detecting a periodic (re)synchronization signal in a neighbor cell in a cellular network, the method comprising:
a. Determining a deployment alternative;
b. Determining a configuration based on the deployment alternative; and
c. Attempting to detect the synchronization signal in a cell with the given configuration.

Method 17: Method 16 and where the deployment alternative is received through SI signaling.

Method 18: Methods 16-17 and where a first deployment alternative is collocation of the synchronization signal to the same time-frequency resource for all cells in the network.

Method 19: Method 18 and where the configuration is obtained by reading the SI of the camping cell.

Method 20: Methods 16-17 and where a second deployment alternative is a unique allocation of the synchronization signal within a narrowband.

Method 21: Methods 16-17 and where a third deployment alternative is a unique allocation of the synchronization signal within a number of narrowbands.

Method 22: Method 21 and where the number of narrowbands is signaled in SI.

Method 23: Methods 16-17 and where a fourth deployment alternative is a unique allocation of the synchronization signal within the carrier.

Method 24: Methods 20-23 and where the allocation is based on a mathematical formula or a table.

Method 25: Method 24 and where the formula or table entry is based on the cell id of the node.

Method 26: Methods 24-25 and where the formula or table entry is further determined by the signal period, signal duration or camping cell narrowband.

Method 27: Method 1 and transmitting configuration information related to which deployment alternative is selected and further information about the configuration of the deployment alternative.

Some other embodiments are as follows:

Embodiment A1. A network node configured to communicate with a wireless device (WD), the network node configured to, and/or comprising a radio interface and/or comprising processing circuitry configured to:
determine a deployment alternative for a resynchronization signal (RSS);
determine an RSS configuration, the RSS configuration based at least in part on the determined deployment alternative; and
optionally, allocate the RSS according to the determined RSS configuration.

Embodiment A2. The network node of Embodiment A1, wherein the processing circuitry is further configured to determine the deployment alternative from a set of deployment alternatives, the set including one or more of:
collocation of the RSS in the same time-frequency resource for all cells in a network;
a unique allocation of the RSS within a narrowband;
a unique allocation of the RSS within a number of narrowbands; and
a unique allocation of the RSS within a carrier.

Embodiment A3. The network node of any one of Embodiments A1 and A2, wherein the processing circuitry is further configured to cause the radio interface to transmit an indication of the deployment alternative via one of a System Information (SI) message to a wireless device and an S1 interface to another network node.

Embodiment A4. The network node of any one of Embodiments A1-A3, wherein one or more of:
the RSS configuration is further based at least in part on a cell identification (ID) of the cell;
the RSS configuration is further based at least in part on a formula; and
the RSS configuration indicates a time and/or frequency resource and/or a physical resource block for the RSS.

Embodiment B1. A method implemented in a network node, the method comprising:
determining a deployment alternative for a resynchronization signal (RSS);
determining an RSS configuration, the RSS configuration based at least in part on the determined deployment alternative; and optionally allocating the RSS according to the determined RSS configuration.

Embodiment B2. The method of Embodiment B1, wherein the determining the deployment alternative further comprises selecting the deployment alternative from a set of deployment alternatives, the set including one or more of:
collocation of the RSS in the same time-frequency resource for all cells in a network;
a unique allocation of the RSS within a narrowband;
a unique allocation of the RSS within a number of narrowbands; and
a unique allocation of the RSS within a carrier.

Embodiment B3. The method of any one of Embodiments B1 and B2, further comprising transmitting an indication of the deployment alternative via one of a System Information (SI) message to a wireless device and an S1 interface to another network node.

Embodiment B4. The method of any one of Embodiments B1-B3, wherein one or more of:
the RSS configuration is further based at least in part on a cell identification (ID) of the cell;
the RSS configuration is further based at least in part on a formula; and
the RSS configuration indicates a time and/or frequency resource and/or a physical resource block for the RSS.

Embodiment C1. A wireless device (WD) configured to communicate with a network node, the WD configured to, and/or comprising a radio interface and/or processing circuitry configured to:
- determine a deployment alternative for a resynchronization signal (RSS);
- determine an RSS configuration, the RSS configuration based at least in part on the determined deployment alternative; and
- detect the RSS in a cell using the RSS configuration.

Embodiment C2. The WD of Embodiment C1, wherein the processing circuitry is further configured to determine the deployment alternative from a set of deployment alternatives, the set including one or more of:
- collocation of the RSS in the same time-frequency resource for all cells in a network;
- a unique allocation of the RSS within a narrowband;
- a unique allocation of the RSS within a number of narrowbands; and
- a unique allocation of the RSS within a carrier.

Embodiment C3. The WD of any one of Embodiments C1 and C2, wherein the processing circuitry is further configured to receive an indication of the deployment alternative via a System Information (SI) message.

Embodiment C4. The WD of any one of Embodiments C1-C3, wherein one or more of:
- the RSS configuration is further based at least in part on a cell identification (ID) of the cell;
- the RSS configuration is further based at least in part on a formula; and
- the RSS configuration indicates a time and/or frequency resource and/or a physical resource block for the RSS.

Embodiment D1. A method implemented in a wireless device (WD), the method comprising:
- determining a deployment alternative for a resynchronization signal (RSS);
- determining an RSS configuration, the RSS configuration based at least in part on the determined deployment alternative; and
- detecting the RSS in a cell using the RSS configuration.

Embodiment D2. The method of Embodiment D1, wherein the determining the deployment alternative further comprises selecting the deployment alternative from a set of deployment alternatives, the set including one or more of:
- collocation of the RSS in the same time-frequency resource for all cells in a network;
- a unique allocation of the RSS within a narrowband;
- a unique allocation of the RSS within a number of narrowbands; and
- a unique allocation of the RSS within a carrier.

Embodiment D3. The method of any one of Embodiments D1 and D2, further comprising receiving an indication of the deployment alternative via a System Information (SI) message.

Embodiment D4. The method of any one of Embodiments D1-D3, wherein one or more of:
- the RSS configuration is further based at least in part on a cell identification (ID) of the cell;
- the RSS configuration is further based at least in part on a formula; and
- the RSS configuration indicates a time and/or frequency resource and/or a physical resource block for the RSS.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method implemented in a wireless device configured to wirelessly connect to a first cell in a radio network, the method comprising:
   determining a deployment alternative for a resynchronization signal, RSS, in the radio network, determining the deployment alternative comprising receiving an indication of the deployment alternative via system information, the determining of the deployment alternative including determining whether a time-frequency resource used for an RSS in a second cell in the radio network is a same time-frequency resource as a time-frequency resource used for an RSS in the first cell;
   determining information about an RSS time-frequency resource used in the second cell in the radio network based at least in part on the determined deployment alternative;
   detecting the RSS in the second cell using the determined information about the RSS time-frequency resource used in the second cell; and
   when the determining of the deployment alternative indicates that the time-frequency resource used for the RSS in the first cell is different from the time-frequency resource used for the RSS in the second cell, then a frequency of the time-frequency resource used for the RSS in the second cell is determined based at least in part on a function of a cell identity of the second cell.

2. The method of claim 1, further comprising performing one or more measurements using the detected RSS in the second cell.

3. The method of claim 1, further comprising, when the determining of the deployment alternative indicates that the time-frequency resource used for the RSS in the first cell is different from the time-frequency resource used for the RSS in the second cell, receiving an indication of which one or more narrowbands are used for RSS in the radio network via a System Information, SI, message.

4. The method of claim 1, wherein, when the determining of the deployment alternative indicates that the time-frequency resource used for the RSS in the first cell is different from the time-frequency resource used for the RSS in the second cell, then a time of the time-frequency resource used for the RSS in the second cell is determined based at least in part on a second function of the cell identity of the second cell.

5. The method of claim 4, wherein the second function is based on a periodicity of an RSS in the first cell.

6. A wireless device configured to be wirelessly connected to a first cell in a radio network, the wireless device comprising processing circuitry configured to cause the wireless device to:
   determine a deployment alternative for a resynchronization signal, RSS, in the radio network, determining the deployment alternative comprising receiving an indication of the deployment alternative via system information, the determining of the deployment alternative including determining whether a time-frequency resource used for an RSS in a second cell in the radio network is a same time-frequency resource as a time-frequency resource used for the RSS in the first cell;
   determine information about an RSS time-frequency resource used in the second cell in the radio network based at least in part on the determined deployment alternative;
   detect the RSS in the second cell using the determined information about the RSS time-frequency resource used for the RSS in the second cell; and
   when the determining of the deployment alternative indicates that the time-frequency resource used for the RSS in the first cell is different from the time-frequency resource used for the RSS in the second cell, then a frequency of the time-frequency resource used for the RSS in the second cell is determined based at least in part on a function of a cell identity of the second cell.

7. The wireless device of claim 6, wherein the processing circuitry is further configured to cause the wireless device to perform one or more measurements using the detected RSS in the second cell.

8. The wireless device of claim 6, wherein the processing circuitry is further configured to cause the wireless device to:
   when the determining of the deployment alternative indicates that the time-frequency resource used for the RSS in the first cell is different from the time-frequency resource used for the RSS in the second cell, receive an indication of which one or more narrowbands are used for RSS in the radio network via a System Information, SI, message.

9. The wireless device of claim 6, wherein, when the determining of the deployment alternative indicates that the time-frequency resource used for the RSS in the first cell is different from the time-frequency resource used for the RSS in the second cell, then a time of the time-frequency resource used for the RSS in the second cell is determined based at least in part on a second function of the cell identity of the second cell.

10. The wireless device of claim 9, wherein the second function is based on a periodicity of an RSS in the first cell.

11. A method implemented in a network node configured to serve one or more cells in a radio network, the method comprising:
   determining a deployment alternative for a resynchronization signal, RSS, in the radio network, the determining of the deployment alternative including determining whether an RSS time-frequency resource used for a first cell is used for at least one additional cell served by the network node in the radio network;
   providing an indication of the deployment alternative via system information to a wireless device;

determining information about an RSS time-frequency resource in the at least one additional cell in accordance with the determined deployment alternative;

allocating the RSS in the at least one additional cell according to the determined information about the RSS time-frequency resource in the at least one additional cell; and when the determining of the deployment alternative indicates that the RRS time-frequency resource used in the first cell is different from the RRS time-frequency resource used in the at least one additional cell, then a frequency of the RSS time-frequency resource used in the at least one additional cell is determined based at least in part on a function of a cell identity of the at least one additional cell.

12. The method of claim 11, wherein determining the deployment alternative further includes determining whether an RSS time-frequency resource used for a first cell is being used for all of a plurality of cells in the radio network.

13. The method of claim 11, further comprising sending an indication about which one or more narrowbands are used for RSS in the radio network via a System information, SI, message in the at least one additional cell.

14. The method of claim 11, wherein when the determining of the deployment alternative indicates that the RRS time-frequency resource used in the first cell is different from the RRS time-frequency resource used in the at least one additional cell, then a time of the RSS time-frequency resource used in the at least one additional cell is determined based at least in part on a second function of the cell identity of the at least one additional cell.

15. The method of claim 14, wherein the second function is based on a periodicity of an RSS in the first cell.

16. The method of claim 11, wherein determining a deployment alternative includes receiving a message from another network node in the radio network or a core network node serving the radio network node.

17. A network node configured to serve one or more cells in a radio network, the network node comprising processing circuitry configured to cause the network node to:

determine a deployment alternative for a resynchronization signal, RSS, in the radio network, the determining of the deployment alternative including determining whether an RSS time-frequency resource used for a first cell is used for at least one additional cell served by the network node in the radio network;

provide an indication of the deployment alternative via system information to a wireless device;

determine information about an RSS time-frequency resource in the at least one additional cell in accordance with the determined deployment alternative;

allocate the RSS in the at least one additional cell according to the determined information about the RSS time-frequency resource in the at least one additional cell; and when the determining of the deployment alternative indicates that the RRS time-frequency resource used in the first cell is different from the RRS time-frequency resource used in the at least one additional cell, then a frequency of the RSS time-frequency resource used in the at least one additional cell is determined based at least in part on a function of a cell identity of the at least one additional cell.

18. The network node of claim 17, wherein determining the deployment alternative further includes determining whether an RSS time-frequency resource used for a first cell is being used for all of a plurality of cells in the radio network.

19. The network node of claim 17, wherein the processing circuitry is further configured to cause the network node to send an indication about which one or more narrowbands are used for RSS in the radio network via a System information, SI, message in the at least one additional cell.

20. The network node of claim 17, wherein, when the determining of the deployment alternative indicates that the RRS time-frequency resource used in the first cell is different from the RRS time-frequency resource used in the at least one additional cell, then a time of the RSS time-frequency resource used in the at least one additional cell is determined based at least in part on a second function of the cell identity of the at least one additional cell.

21. The network node of claim 20, wherein the second function is based on a periodicity of an RSS in the first cell.

22. The network node of claim 17, wherein determining a deployment alternative includes receiving a message from another network node in the radio network or a core network node serving the radio network node.

* * * * *